May 1, 1928.

M. ZUSMER 1,668,257

CUTTING MACHINE

Filed July 12, 1927    2 Sheets-Sheet 1

Inventor

Moses Zusmer

By Clarence A. O'Brien
Attorney

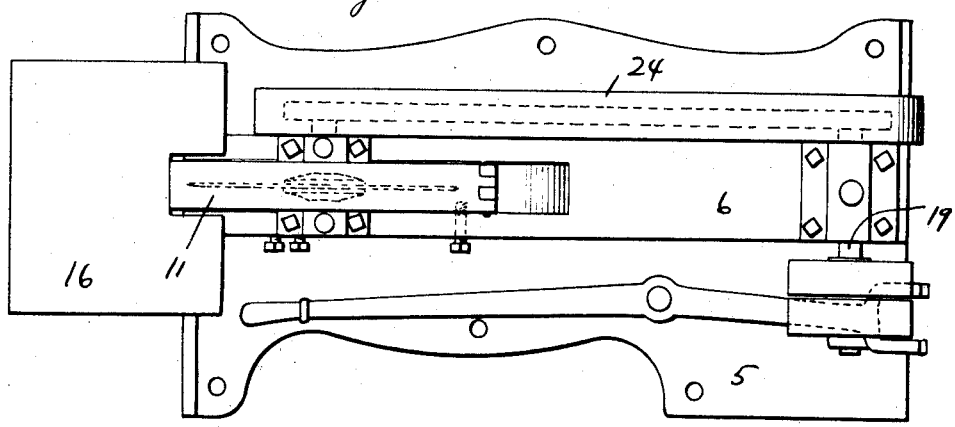
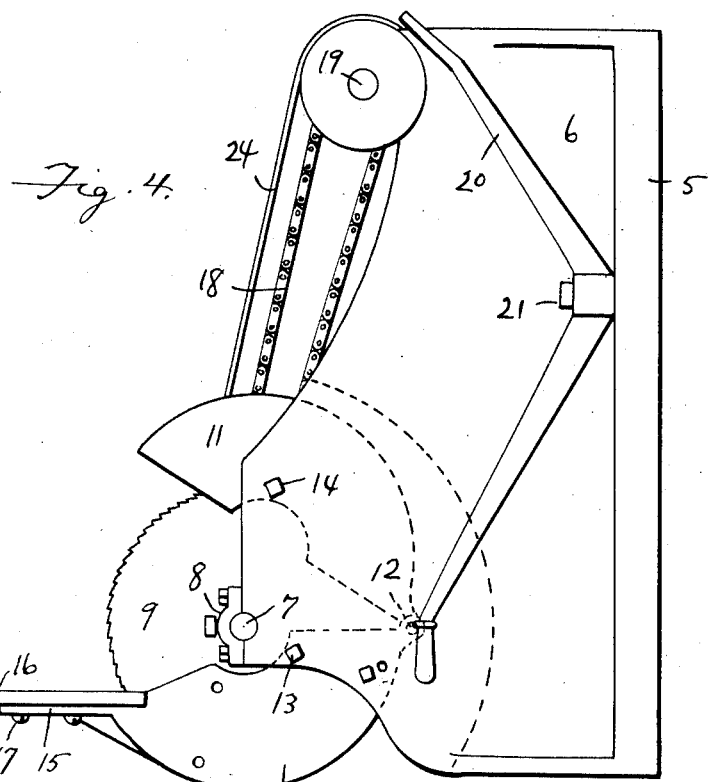

Patented May 1, 1928.

UNITED STATES PATENT OFFICE.

MOSES ZUSMER, OF BRONX, NEW YORK.

CUTTING MACHINE.

Application filed July 12, 1927. Serial No. 205,230.

The present invention relates to a cutting machine designed primarily for cutting skins and the like for the purpose of trimming the same and also being constructed as to be useful as a butcher's saw or the like.

An important object of the invention resides in the provision of a device of this nature which is handy, easy to manipulate, thoroughly efficient and reliable in its operation, compact, strong and durable, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:—

Figure 3 is a top plan view thereof, Figure 4 is a side elevation similar to Figure 1 but showing the device in the different positions.

Figure 1:
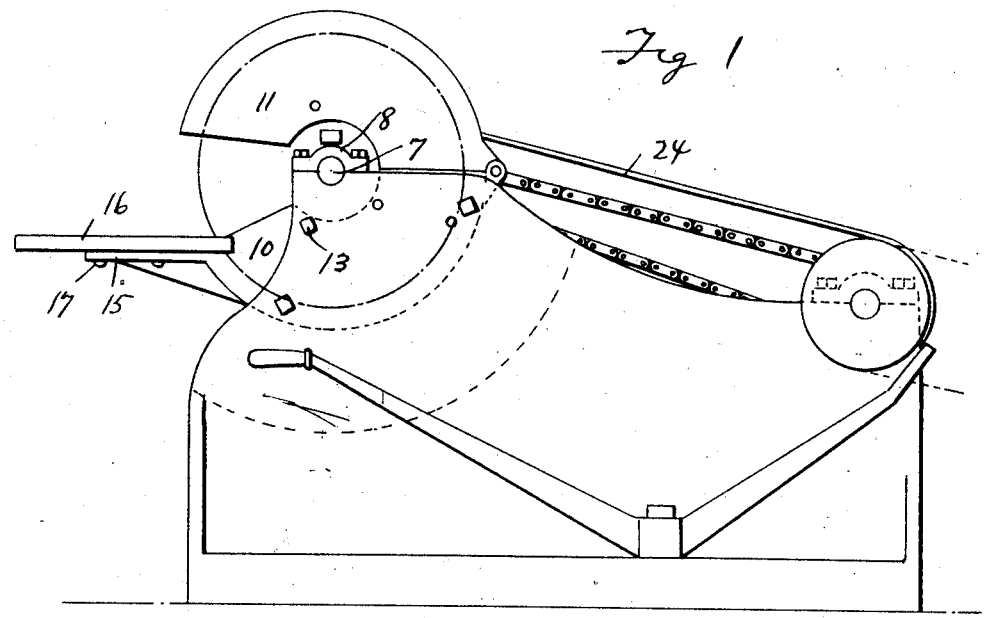
Figure 1 is a side elevation of the device showing the same in one position.

Referring to the drawing in detail it will be seen that the numeral 5 denotes a base which has a block 6 extending in a perpendicular plane therefrom and longitudinally thereof. It is preferable to construct the base and block 6 in a single casting. The block 6 is formed with a recess and a shaft 7 is journaled across the recess by means of bearings 8 and carries a cutter 9 which is shown as a knife in Figures 1 and 2 and as a saw in Figure 4.

A guard casing is associated with the cutter 9 and comprises two sections 10 and 11 which are hinged together as at 12 at one end. The section 10 may be bolted as at 13 in the position shown in Figure 4 or in the position shown in Figure 1 while the section 11 may be bolted as at 14 in the position shown in Figure 4 or the position shown in Figure 1. The section 10 has an extension 15 on which may be secured when desired a platform 16 by means of screws 17 or other detachable elements. The shaft 7 is driven by a chain and sprocket connection 18 from a drive shaft 19 at the other end of the block, and this shaft 19 is driven by a belt or in any other suitable manner, and if driven by a belt a shifter element 20 is pivotally mounted at 21 on the base intermediate its ends so as to be controllable at a convenient point adjacent the cutter. A chain tightener 22 is mounted on the block 6 and is adjustable so that the chain may have the proper tension thereon at all times to provide maximum efficiency.

Figure 2:
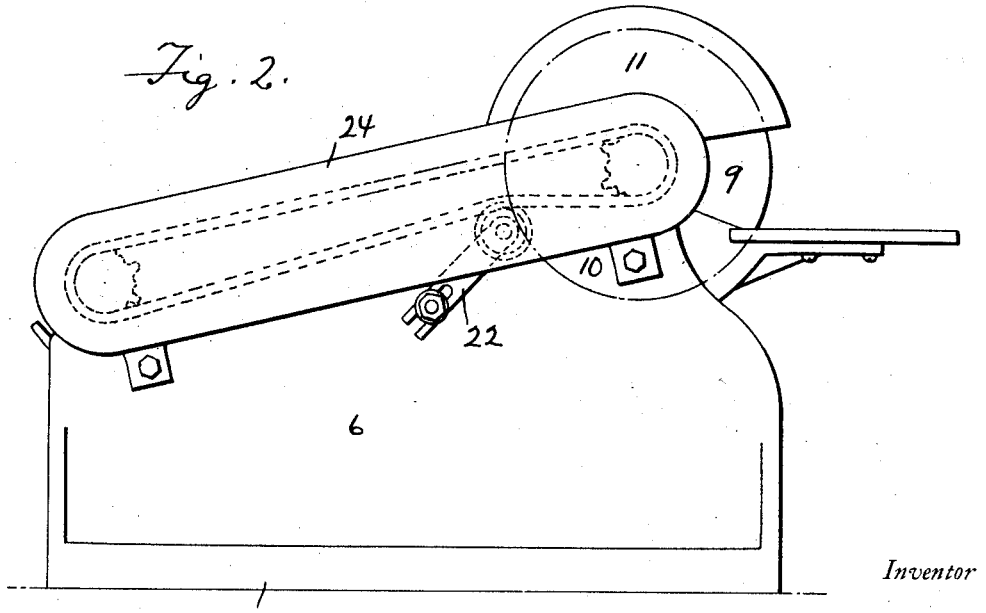
Figure 2 is another side elevation thereof taken opposite to that shown in Figure 1.

When the device is disposed as shown in Figure 1 it is preferable to remove the platform or shelf 16 and the cutter knife may be used to advantage in trimming skins and the like. When the device is used for sawing bones and the like it is preferably disposed as is shown in Figure 4 and the platform or shelf 16 is used.

It will be seen that the device is very handy, compact, and convenient. It is thought that the construction, operation, utility and advantages of the invention will be readily understood without a more detailed description thereof.

The present embodiment of the invention has been shown in detail merely by way of example since in actual practice it attains the features of advantage enumerated as desirable in the statement of the invention and the above description. Thus if desirable a hood or casing 24 may be provided over the chain sprocket drive 18. Other changes in the details of construction and in the combination and arrangement of parts may be resorted to without departing from the spirit or scope of the invention as hereinafter claimed without sacrificing any of its advantages.

Having thus described the invention, what I claim as new and desire to secure by Letters Patent is:—

A mechanism of the class described comprising a block formed with a recess, a shaft journaled across the recess, a cutter on the shaft to rotate in the recess with portions projecting therefrom, means for driving the shaft, a guard comprising a pair of sections hinged together in the recess about the cutter, bolts engageable with the guard sections and the block for holding said sections in different relative positions to the block and to each other for the purpose of regulating the amount of the cutter desired to be exposed, and one of the guard sections having an extension for receiving a shelf.

In testimony whereof I affix my signature.

MOSES ZUSMER.